Oct. 20, 1936.  C. A. SAWTELLE ET AL  2,057,847
VEHICLE BRAKE ASSEMBLY
Filed March 2, 1931    2 Sheets-Sheet 1
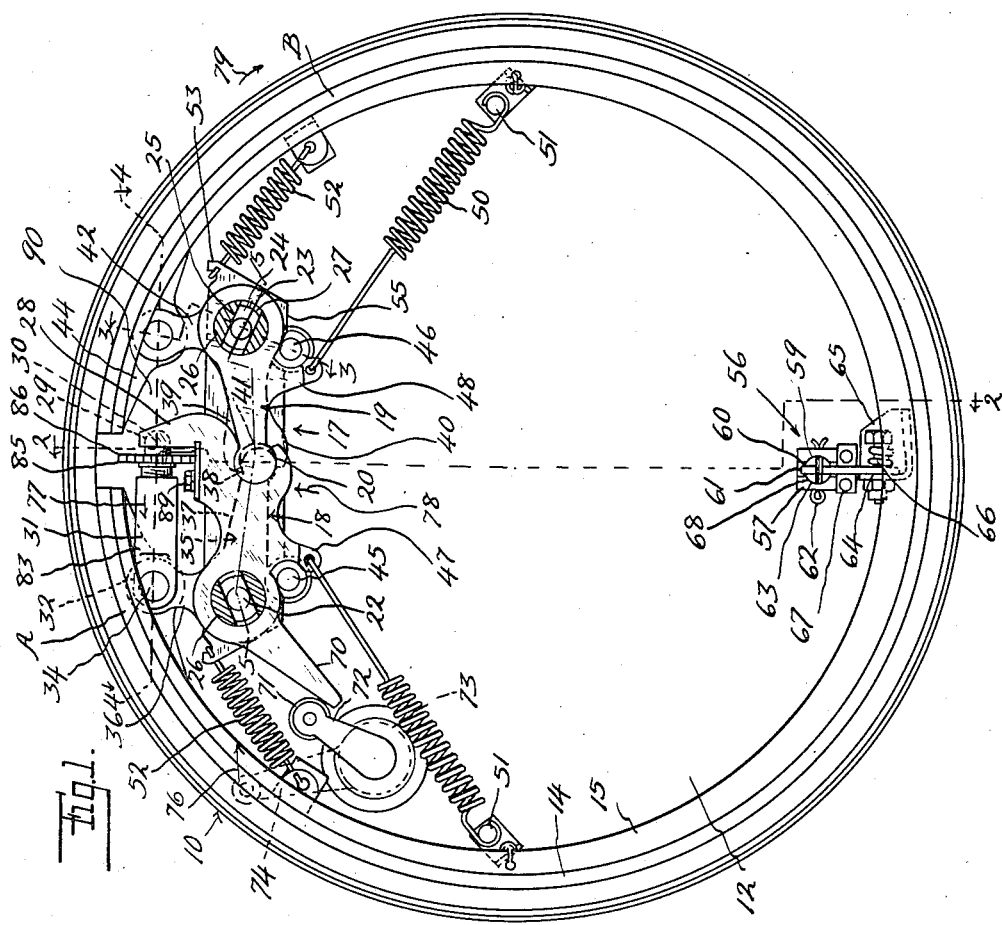
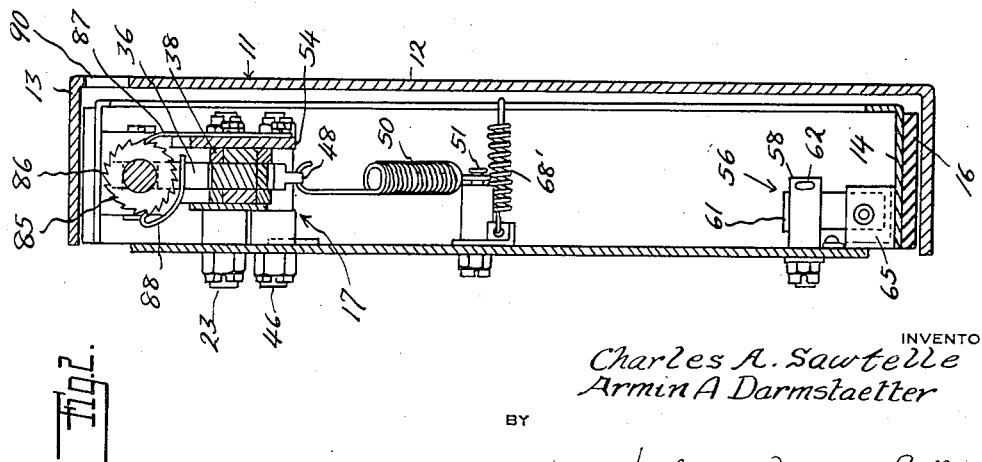
INVENTORS
Charles A. Sawtelle
Armin A Darmstaetter

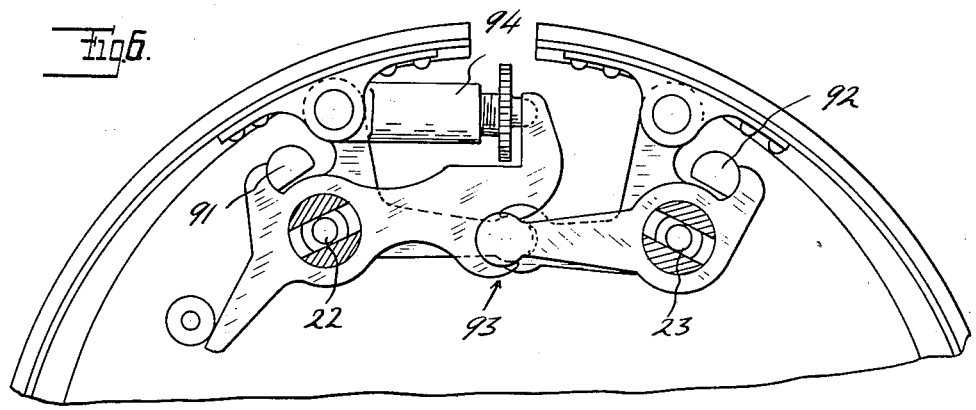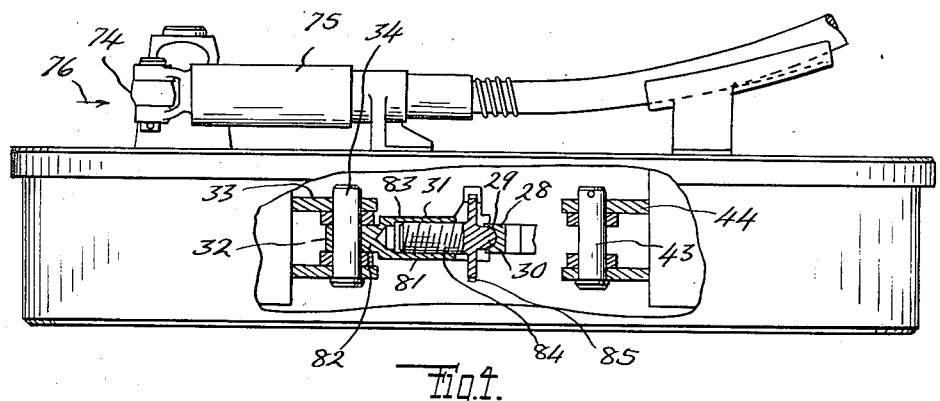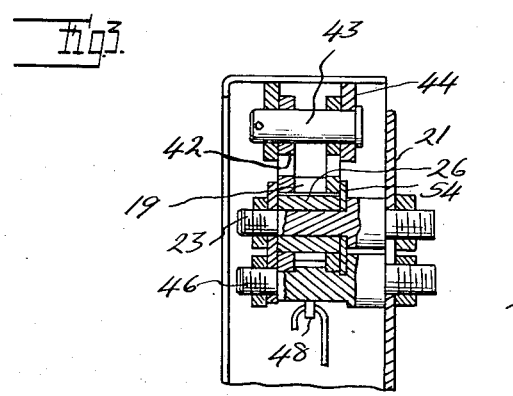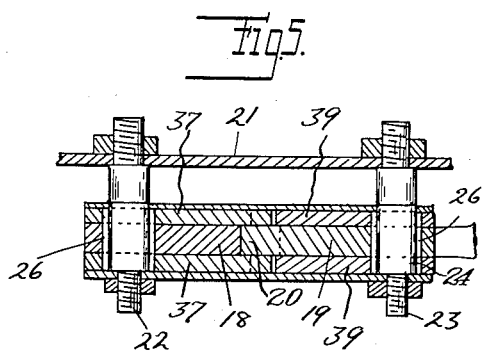

Patented Oct. 20, 1936

2,057,847

UNITED STATES PATENT OFFICE 2,057,847

VEHICLE BRAKE ASSEMBLY

Charles A. Sawtelle and Armin A. Darmstaetter, Detroit, Mich., assignors to S. and D. Engineering Company, Detroit, Mich., a corporation of Michigan Application March 2, 1931, Serial No. 519,619

19 Claims. (Cl. 188—78)

This invention relates generally to brakes and more particularly to vehicle wheel brakes of the internal expanding type having a drum provided with an annular braking surface and having a band located within the drum in predetermined relationship to the braking surface.

The invention contemplates the provision of a brake assembly so constructed as to be equally effective in braking when rotating in either direction and has as one of its principal objects to provide improved mechanism for expanding the band into engagement with the drum so designed as to reduce the pedal pressure necessary to fully apply the brake, to a minimum.

The invention provides for reducing the pedal pressure and improving generally the braking function by providing a construction designed to utilize a large percentage of the torque generated by the drum when rotating in either direction for frictionally engaging the band with the drum.

Another advantageous feature of this invention resides in the provision of adjusting means for the brake located within the drum and automatically operable upon actuation of the brake mechanism for adjusting the band to compensate for wear of the brake.

A further object of this invention is to provide improved means associated with the band for accurately centering the latter within the drum after each operation of the brake.

The foregoing as well as other objects will be made more apparent as this description proceeds, especially when considered in connection with the accompanying drawings, wherein:

Figure 1 is an elevational view of a brake assembly having certain parts broken away for the sake of clearness;

Figures 2, 3 and 4 are sectional views taken substantially on the lines 2—2, 3—3 and 4—4 of Figure 1;

Figure 5 is a sectional view taken substantially on the line 5—5 of Figure 1 showing the outer set of bell crank levers 35 in position;

Figure 6 is a fragmentary view similar to Figure 1 showing a slightly modified form of construction.

Referring now to the drawings, it will be noted that there is illustrated in Figure 1 a brake assembly 10 comprising a brake drum 11 having a web portion 12 terminating at the outer edges in an annular brake flange 13. Mounted within the drum 11 concentric with the annular brake flange 13 is a brake band 14 formed with a radially inwardly extending reinforcing rib 15 having its greater width at the center of the band and tapering from the center toward the ends of the band. The band is further provided with a suitable non-metallic lining 16 adapted to be moved into frictional engagement with the braking surface of the flange 13 by the brake actuating mechanism designated generally herein by the reference character 17.

The brake actuating mechanism about to be described establishes a tie between the ends of the band and functions upon manipulation of a suitable control element (not shown) for expanding the band into engagement and conformity with the brake flange. In detail, the actuating mechanism 17 comprises a pair of links 18 and 19 having their inner ends pivotally connected together as at 20 and having their outer ends pivotally supported upon the backing plate 21. The pivotal connections between the outer ends of the links 18 and 19 and backing plate are of such construction as to permit limited rotative movement of the band relative to the drum in both directions. The aforesaid floating pivotal connections for the links comprises a pair of studs 22 and 23 secured in any suitable manner to the backing plate and having portions 24 intermediate the ends thereof provided with substantially flat opposed surfaces 25. Positioned upon the surfaces 25 is a pair of bearing segments 26 forming a journal for the links 18 and 19. As will be apparent from Figure 1 of the drawings, the bearing segments 26 cooperate with the apertures through the outer ends of the links to form elongated slots 27 permitting relative sliding movement of the links and portions 24 of the studs 23. The slots 27 are arranged on a common radius struck from the axis of rotation of the drum in such a manner as to permit the desired shifting movements of the band relative to the drum. The pivotal connection 20 between the inner ends of the links 18 and 19 is accomplished by recessing the link 18 for receiving a circular head portion formed on the adjacent end of the link 19. The arrangement is such as to secure the links in assembled relation with each other, but at the same time to permit movement of the links about their respective bearings 26. The link 18 is further provided with a radially outwardly extending projection 28 having a semi-spherical recess 29 therein for receiving a correspondingly shaped portion 30 on the inner end of a suitable adjusting device 31 to be more fully hereinafter described. The outer end of the adjusting device is pivotally connected as at 32 to a pair of laterally spaced ears 33 projecting inwardly from the band adjacent one end thereof. The pivotal connection aforesaid is accomplished by means of a pin 34 extending through aligned openings formed in the ears and having a portion thereof intermediate the ears engaging the outer end of the adjusting device 31.

Journaled upon the bearing sections 26 carried by the stud 22 on opposite sides of the link 18 is a pair of bell crank levers 35 having radially outwardly extending arms 36 journaled upon the pin 34 on opposite sides of the adjusting device 31 as clearly shown in Figure 4 of the drawings. In other words, the arms 36 of the bell crank levers 35 are pivotally connected to the ears 33 on the band by the pin 34. The bell crank levers 35 are further provided with arms 37 extending inwardly in the direction of the link 18 and terminating in substantially circular head portions 38 having their centers substantially in alignment with the centers of the cooperating recess and head portion on the links 18 and 19.

Journaled upon the bearing sections 26 carried by the stud 23 is a second pair of bell crank levers 39 arranged on opposite sides of the link 19 and in substantially the same plane as the bell crank levers 35. The bell crank levers 39 are provided with arms 40 extending inwardly in the direction of the link 19 and are formed with recesses 41 at the inner ends for receiving the circular head portions 38 of the bell crank arms 37. It is to be noted, however, that the connection between the adjacent ends of the arms 37 and 40 provide for restricted displacement of the respective bell crank levers 35 and 39 so as to permit the latter to assume various adjusted positions relative to the links 18 and 19 without binding or otherwise interfering with the normal operation of the mechanism. The bell cranks 39 are further provided with radially outwardly extending arms 42 similar to the arms 36 hereinbefore described and are pivotally connected to the opposite end of the band by means of a pin 43 carried by ears 44 fixed to and extending radially inwardly from the latter end portion of the band. From the foregoing, it will be observed that since both sets of bell cranks 35 and 39 are respectively journaled upon the same floating pivots as the links 18 and 19, the entire mechanism will be permitted to rotate relative to the drum with the band.

Rotation of the mechanism relative to the drum is limited, however, by a pair of permanent anchors 45 and 46 respectively engageable with the links 18 and 19. As shown in Figure 1, the links 18 and 19 are provided with lateral extensions 47 and 48, respectively, having circular outer surfaces 49 corresponding to the adjacent surfaces of the anchors 46 and normally restrained into engagement therewith by means of suitable springs 50. The springs 50 are connected at their inner ends to the extensions 47 and 48 and at their outer ends to studs 51 fixed to the backing plate in any suitable manner. The location of the anchors 45 and 46 is so determined that when the extensions 47 and 48 are restrained into engagement therewith by the springs 50, the braking surface of the band is held by the levers and links, previously described, in predetermined spaced relation to the brake flange. In this connection it is to be noted that the springs 50 are assisted in their function of retracting the band from engagement with the brake flange by auxiliary springs 52 having their outer ends fixed to opposite sides of the band in spaced relation to the studs 51 and having their inner ends fixed to a suitable plate 53.

The plate 53 and a cooperating plate 54 are arranged upon opposite sides of the links and levers forming a part of the brake actuating mechanism. The plate 53 is positioned at the rear side of the mechanism and is rigidly secured to the backing plate by means of the studs 22 and 23. The plate 54, on the other hand, is arranged at the front side of the mechanism and is clamped in assembled relation with the plate 53 by means of both the aforesaid studs and the anchors 45 and 46. The plates 53 and 54 serve to retain the bearing segments 26 in assembled relation with the linkage mechanism and in addition, the plate 53 is provided with spaced shoulders 55 for engaging correspondingly flattened surfaces on the permanent anchors to prevent rotation of the latter during assembling.

In order to maintain the band in concentric relation to the brake flange and for insuring return of the band to the same position after each application of the brake, we provide a centering device 56 associated with the central portion of the band. The centering device comprises a stud 57 extending into the brake drum as shown in Figure 2. The stud 57 is provided with a shank 58 substantially rectangular in cross-section and having an axially extending opening 59 therein. The inner and outer sides of the shank 58 are formed with aligned slots 60 elongated in the direction of the axis of the stud for receiving a substantially flat plate 61. The plate 61 is normally held from axial displacement by means of a cotter pin 62 extending transversely through the end of the stud across the opening 59 therein. The opposite side walls 63 of the slots 60 are tapered outwardly from the axis of the stud so as to permit swinging movement of the plate in the direction of rotation of the drum. One side of the lower end portion of the plate 61 engages a correspondingly shaped projection 64 extending radially inwardly from a suitable bracket 65 secured to the inner surface of the brake band substantially centrally of the latter. The side aforesaid of the plate 61 is normally urged into engagement with the projection 64 on the bracket by means of a coil spring 66 carried by a suitable fastener element extending through aligned openings in the lower end of the plate and projection 64. Thus, from the foregoing it will be apparent that rotation of the band from its normal position shown in Figure 1 causes a corresponding rotation of the bracket 65 about the axis of rotation of the drum and also causes a rotation of the plate 61 about the axis of the stud 58. Rotation of the plate and bracket about different axes effects a relative movement of the plate and stud and since such movement is resisted by the spring 66, it will be apparent that the latter tends to return the plate and bracket to their initial relative positions. Thus, it will be readily seen that as soon as the brakes are released, the spring upon returning the plate 61 and bracket to their initial relative positions will also return the brake band to its initial inoperative position since the bracket is secured thereto. In this connection it is to be noted that the backing plate is slotted for the reception of the stud 68 so as to permit initial adjustment of the same to accurately center the band and rotation of the stud relative to the backing plate is prevented by means of a bar 67 secured to the backing plate in a position to engage the lower wall of the rectangular-shaped shank 58. In addition to insuring centralization of the band within the drum, means in the form of springs 68' is provided for maintaining the band spaced from the web of the drum. As shown in Figure 2, the outer ends of the springs 68' are hooked over the band and the inner ends thereof are secured to suitable clips fastened to the backing plate.

For operating the brake actuating mechanism 17 hereinbefore described, it will be noted from Figure 1 that the link 18 is provided with an extension 70 projecting outwardly from the axis of the stud 22 and engageable with a roller 71 journaled upon the free end of an arm 72 which in turn is secured to a suitable rockshaft 73 journaled in the backing plate 21. The rockshaft 73 projects rearwardly from the backing plate and has secured thereto a suitable lever 74 connected to suitable brake actuating linkage 75 which in turn is operatively secured to a suitable control element (not shown). Assuming that the parts of the brake are in the position shown in Figure 1 wherein the brake band is spaced a predetermined distance from the brake flange of the drum and that it is desired to apply the brake, the control element (not shown) is actuated to exert a pull upon the lever 74 in the direction of the arrow 76. Movement of the lever 74 in the aforesaid direction causes the arm 72 to move in a corresponding direction and since the latter arm engages the extension 70 on the link 18, it will be apparent that the latter is moved by the arm 72 in a counterclockwise direction about the axis of the stud 22. Movement of the link 18 in a counterclockwise direction causes the extension 28 on the arm to engage the adjusting device 31 and move the latter in the direction of the arrow 77 to engage the portion A of the brake band with the adjacent portion of the brake flange on the drum.

Movement of the portion A of the band into engagement with the drum effects a shifting movement of the pin 34 in the direction of the arrow 77 and since the pin is connected to the arms 36 of the levers 35, it will be apparent that the latter will also be rotated about the axis of the stud 22 in a counterclockwise direction. As previously stated, the arms 37 of the levers 35 are connected to corresponding arms 40 of the levers 39, with the result that movement of the arms 37 outwardly or in the direction of the arrow 78 causes a corresponding movement of the arms 40 on the levers 39 or in other words, effects a movement of the latter levers about the axis of the studs 23 in a counter-clockwise direction. As will be apparent from Figure 1, movement of the levers 39 in a counter-clockwise direction causes a corresponding movement of the arms 42 of the levers and since the latter arms are connected to the pin 43, the latter will be shifted outwardly causing the opposite portion B of the band to engage the braking surface of the drum. It is to be noted at this time that movement of the inner ends of the links 18 and 19 outwardly to apply the brake causes the extensions 47 and 48 to move away from the anchors 45 and 46 due to the fact that these extensions move with the links about the axes of the studs 22 and 23. Assuming now that the drum is rotating in the direction of the arrow 79, it will be apparent that initial engagement of the portion B with the drum causes the entire band and actuating mechanism to rotate with the drum setting up a wrapping force in the portion B of the band tending to assist in moving the band into engagement with the drum and a counteracting unwrapping force in the portion A of the band. However in view of the fact that the leverage ratio for actuating the portion A of the band is equal to the leverage ratio for actuating the portion B, it necessarily follows that the force set up by the unwrapping portion of the band tending to resist the pedal pressure to operate the linkage is counteracted by a force of equal magnitude set up in the wrapping portion of the band tending to assist the pedal pressure.

It is desirable, however, to utilize a percentage of the torque generated by the drum to apply the brake and this result is accomplished in the present instance in the following manner. As previously stated, initial operation of the linkage to expand the band causes the extensions 47 and 48 to assume positions spaced from the anchors so as to permit rotation of the band unit in the direction of the arrow 79. Movement of the band unit in the aforesaid direction causes the extension 48 to engage the anchor 46 whereupon further movement of the linkage is prevented. The torque generated by the drum, however, tends to continue rotation of the band linkage in the direction of the arrow 79 and in so doing causes the link 17 to fulcrum about the fixed anchor 46 in the direction of the arrow 78 to apply the brake. As will be observed from Figure 1, the disposition of the anchor 46 relative to the stud 23 is such that the leverage for actuating the portion B of the band is considerably increased in favor of the torque generated by the drum and since the leverage, through which the counteracting force set up by the portion A of the band acts, remains unchanged, it necessarily follows that the torque generated, more than overcomes this counteracting force and accordingly assists the pedal pressure in applying the brake. Application of the brake when the drum is rotating in the direction of the arrow 80 is accomplished in the same manner and with identical results. Accordingly, braking is equally effective and is accomplished with the same amount of ease when the drum is rotating in either direction.

As previously stated, it is one of the objects of this invention to provide means for automatically adjusting the brake to compensate for wear. The foregoing is accomplished in the present instance by providing the adjusting device 31 establishing an operative connection between the extension 28 of the link 18 and the pin 34 carried by the portion A of the band. The adjusting device comprises a fitting 81 having a reduced portion 82 at the outer end apertured to receive the pin 34 and having a counterbored or tubular portion 83 at the inner end threaded for receiving a stud 84. The stud 84 is provided adjacent the inner end thereof with a ratchet wheel 85 having a series of teeth 86 thereon for engaging a spring detent 87 secured to the front plate 54 of the brake actuating mechanism. A second spring detent 88 is secured to the link 18 adjacent the extension 28 by means of a fastener element 89 and as shown in Figure 2 also engages the teeth on the ratchet wheel. The spring detents 87 and 88 engage the ratchet wheel at diametrically opposite sides thereof and serve to prevent accidental rotation of the ratchet wheel. The detent 88 being secured upon the link 18 is adapted to move as a unit therewith upon actuation of the brake mechanism. As will be apparent from Figure 2, the construction is such that movement of the link 18 in the direction of the arrow 78 to apply the brake causes a corresponding movement of the detent 88, but owing to the formation of the teeth on the ratchet wheel, it will be observed that the detent will merely slide upwardly upon the inclined surface of the tooth adjacent to the one with which it is engaged. Rotation of the ratchet wheel by the frictional engagement of the detent 88 therewith will obviously be prevented by engagement of the detent 87 with one of the teeth on the opposite side of the wheel. The length of the inclined surfaces of the teeth is so determined as to permit a predetermined travel of the band outwardly with the result that when the brake is accurately adjusted, movement of the link 18 to apply the brake will not be sufficient to advance the detent beyond the inclined surface. However, as the clearance between the brake band and braking surface increases due to wear, a greater travel of the link 18 will be necessary to fully apply the brakes. When the clearance aforesaid between the braking surface and brake band exceeds a predetermined amount, the detent 88 moving with the link 18 is advanced at least one tooth on the ratchet wheel 85. Thus, when the brake is released and the mechanism returned to its normal position by the springs 50, the detent 88 in moving with the link 18 to its original starting position, will effect a rotation of the ratchet wheel the distance of one tooth and since the ratchet wheel is a part of the stud 84, the latter will also be rotated to lengthen the connection between the extension 28 of the link and pin 34 accordingly and thereby move the band into closer proximity to the braking surface. If desired, a suitable aperture 90 may be provided in the web of the drum through which a suitable tool may be extended for engaging the ratchet teeth to accomplish a manual adjustment of the brakes.

While the adjusting means previously described is capable for use in various designs of brakes, it is of particular utility when used in connection with the brake assembly illustrated herein since by limiting the clearance between the braking surfaces to a predetermined amount, the extent of rotation of the band unit is limited to such a degree as to prevent the band from anchoring on the studs 22 and 23.

The modified form of invention illustrated in Figure 6 differs from the one previously described, in the location of the permanent anchors 91 and 92. The permanent anchors 91 and 92 correspond to the anchors 45 and 46 hereinbefore described and function through the linkage designated generally by the reference character 93 to anchor the band in the same manner as the corresponding anchors 45 and 46 hereinbefore described. In detail, the anchors 91 and 92 in the construction shown in Figure 5 are located radially outwardly from the studs 22 and 23 instead of radially inwardly from the same as in the construction shown in Figure 1. The band and associated mechanism functions in the same manner as previously described to apply the brake and the adjusting device 94 operates in the same manner as the device 31 for maintaining a predetermined clearance between the braking surfaces.

What we claim as our invention is:

1. In a brake assembly, the combination with a brake drum having an annular braking surface, of floating friction means located within the drum for engagement with the braking surface and having separable end portions, linkage carried by the friction means for movement therewith as a unit and establishing a tie between the ends aforesaid, said linkage proportioned to equalize the forces set up by the wrapping and unwrapping portions of the friction means upon engagement of the latter with the braking surface, and means operable upon shifting movement of the friction means in either direction to increase the leverage ratio of the linkage connected to the wrapping portion of the friction means and thereby utilize a percentage of the torque generated by the drum to actuate the linkage for expanding the friction means into engagement with the braking surface.

2. In a brake assembly, the combination with a brake drum having an annular braking surface, of floating friction means located within the drum for engagement with the braking surface and having separable end portions, actuating means for the friction means including a pair of links having the outer ends operatively connected respectively to opposite ends of the friction means and having the inner ends secured together for movement as a unit with the band, a journal for each of said links carried by a part fixed relative to the drum and friction means for shifting movement with the latter substantially about the axis of the drum, and means operable upon rotation of the drum in either direction for anchoring the friction means through the linkage.

3. In a brake assembly, the combination with a brake drum having an annular braking surface, of floating friction means located within the drum for engagement with the braking surface and having separable end portions, actuating means for the friction means including a pair of links having the outer ends operatively connected respectively to opposite ends of the friction means and having the inner ends secured together for movement as a unit with the band, a journal for each of said links carried by a part fixed relative to the drum, means operable upon rotation of the drum in either direction for anchoring the friction means through the linkage to simultaneously increase the leverage ratio of the linkage connected to the wrapping portions of the friction means.

4. In a brake assembly, the combination with a brake drum having an annular braking surface, of floating friction means arranged within the drum for engagement with the braking surface and having separable ends, linkage carried by the friction means for movement therewith as a unit and including levers having their outer ends operatively connected respectively to the ends aforesaid of the friction means and having their inner ends tied together, floating pivots carried by a part fixed relative to the drum and engaging the levers intermediate the ends of the latter, and a single permanent anchor for anchoring the friction means through the linkage.

5. In a brake assembly, the combination with a brake drum having an annular braking surface, of floating friction means arranged within the drum for engagement with the braking surface and having separable ends, linkage carried by the friction means for movement therewith as a unit and including levers having their outer ends operatively connected respectively to the ends aforesaid of the friction means and having their inner ends tied together, floating pivots carried by a part fixed relative to the drum and engaging the levers intermediate the ends of the latter, said levers proportioned to equalize the forces set up by the wrapping and unwrapping portions of the friction means upon engagement of the latter with the braking surface irrespective of the direction of rotation thereof, and means operable through the linkage to anchor the friction means and to simultaneously increase the leverage ratio of the levers connected to the wrapping portion of the friction means.

6. In a brake assembly, the combination with a brake drum having an annular braking surface, of floating friction means arranged within the drum for engagement with the braking surface and having separable ends, linkage carried by the friction means for movement therewith as a unit and including levers having their outer ends operatively connected respectively to the ends aforesaid of the friction means and having their inner ends tied together, pivots carried by a part fixed relative to the drum for limited shifting movement with the friction means and engaging the levers intermediate the ends of the latter, and an adjusting device forming a part of the connection between the ends of the friction means operable to maintain a clearance between the friction means and braking surface less than the degree of shifting of said pivots so as to prevent the pivots from operating through the levers to anchor the friction means.

7. In a brake assembly, the combination with a brake drum having an annular braking surface, of floating friction means arranged within the drum for engagement with the braking surface and having separable ends, actuating mechanism for the friction means including linkage establishing a tie between the ends of said means and carried thereby, means pivotally connecting the linkage to a part fixed relative to the drum permitting relative rotation of the part and linkage, and means cooperating with the linkage upon engagement of the friction means with the braking surface for utilizing a percentage of the torque generated by the drum for actuating the linkage to assist in applying the brake.

8. In a brake assembly, the combination with a brake drum having an annular braking surface, of floating friction means arranged within the drum for engagement with the braking surface and having separable ends, linkage carried by the friction means for movement therewith as a unit and including levers having their outer ends operatively connected respectively to the ends aforesaid of the friction means and having their inner ends tied together, floating pivots carried by a part fixed relative to the drum and engaging the levers intermediate the ends thereof, and permanent anchors spaced inwardly from the pivots and respectively engaging extensions on the linkage upon rotation of the friction means in opposite directions for increasing the leverage ratio of the levers connected to the wrapping side of the friction means and thereby utilize a percentage of the torque generated by the drum to actuate the levers for applying the brake.

9. In a brake assembly, the combination with a brake drum having an annular braking surface, of floating friction means located within the drum for engagement with the braking surface and having separable end portions, actuating means for the friction means including a pair of links having the outer ends operatively connected respectively to opposite ends of the friction means and having the inner ends secured together for movement as a unit with the band, means pivotally connecting the links to the drum including journals carried by a part fixed relative to the drum and movable relative to said part in the direction of movement of the friction means, and means for anchoring the friction means cooperating with the links to utilize a percentage of the torque generated by the drum for actuating the friction means.

10. In a brake assembly, the combination with a brake drum having an annular braking surface, of a floating brake band located within the drum in spaced relation to the braking surface and having spaced end portions, means carried by the band establishing a connection between the ends aforesaid including levers having the inner ends secured together and having the opposite ends connected respectively to the ends of the band, and a slidable pivotal connection for each lever operable upon expanding the band into frictional engagement with the braking surface to permit limited shifting movement of the band in the direction of rotation of the drum.

11. In a brake assembly, the combination with a brake drum having an annular braking surface, of floating friction means located within the drum in spaced relation to the braking surface thereof and having spaced end portions, linkage carried by the friction means establishing a connection between the ends aforesaid thereof including levers having the inner ends secured together and having the opposite ends connected respectively to the ends of the friction means, and fulcrums for the levers mounted upon a part fixed relative to the drum and friction means and shiftable substantially about the axis of the drum in dependence upon expanding the friction means into engagement with the braking surface to afford limited shifting of the friction means together with the linkage in the direction of rotation of the drum.

12. In a brake assembly, the combination with a brake drum having an annular braking surface, of a floating friction member located within the drum in spaced relation to the friction surface and having spaced end portions, linkage carried by the member establishing a connection between the ends aforesaid of the member including levers having the inner ends connected together and having the opposite ends connected respectively to the ends of the friction member, fulcrums for the levers operable upon expanding the friction member into engagement with the braking surface to afford limited shifting of the member together with the linkage in the direction of rotation of the drum, and an anchor for each of said levers alternately operable upon shifting movement of the friction member in opposite directions to anchor the latter through the levers.

13. In a brake assembly, the combination with a brake drum having an annular braking surface, of a floating friction member located within the drum in spaced relation to the braking surface and having spaced end portions, linkage carried by the friction member establishing a connection between the ends aforesaid of the latter including levers having the inner ends thereof secured together and having the opposite ends connected respectively to the ends of the friction member, fulcrums for the levers operable upon expanding the friction member into engagement with the braking surface to afford limited shifting of the member together with the levers in the direction of rotation of the drum, means alternately operable upon shifting movement of the friction member in opposite directions to anchor the latter through the levers including anchors engageable with the levers at points so determined with respect to the fulcrums aforesaid as to increase the leverage of the linkage connected to the wrapping portion of the friction member.

14. In a brake assembly, the combination with a brake drum having an annular braking surface, of a floating friction member located within the drum in spaced relation to the braking surface and having spaced end portions, linkage carried by the friction member establishing a connection between the ends aforesaid thereof including levers having the inner ends connected together and having the opposite ends connected respectively to the ends of the friction member, fulcrums for the levers operable upon expanding the friction member into engagement with the braking surface to afford limited shifting of the latter together with the levers in the direction of rotation of the drum, the portions of the levers upon opposite sides of the fulcrum being proportioned to equalize the force set up by the wrapping and unwrapping portions of the friction member upon engagement of the latter with the braking surface irrespective of the direction of rotation, and means alternately operable upon shifting movement of the friction member in opposite directions to anchor the said member through the levers including anchors engageable with the levers at points so determined with respect to the fulcrums aforesaid as to increase the leverage of the linkage connected to the wrapping portions of the friction member.

15. In a brake assembly, the combination with a brake drum having an annular braking surface, of floating friction means arranged within the drum for engagement with the braking surface and having separable ends, actuating mechanism for the friction means including linkage establishing a tie between the ends of said means and carried thereby, fulcrums for the linkage operable upon expanding the friction means into engagement with the braking surface to afford limited shifting of the means together with the linkage in the direction of rotation of the drum, and an adjusting device forming a part of the tie aforesaid between the ends of the friction means operable to maintain a clearance between the latter and braking surface less than the degree of shifting of the linkage afforded by the fulcrums so as to prevent the latter from operating through the linkage to anchor the friction means.

16. In a brake assembly, the combination with a brake drum having an annular braking surface, of floating friction means arranged within the drum for engagement with the braking surface and having separable ends, actuating mechanism for the friction means including linkage establishing a tie between the ends of said means and carried thereby, fulcrums for the linkage operable upon expanding the friction means into engagement with the braking surface to afford limited shifting of the means together with the linkage in the direction of rotation of the drum, an adjusting device forming a part of the tie aforesaid between the ends of the friction means operable to maintain a clearance between the latter and braking surface less than the degree of shifting of the linkage afforded by the fulcrums so as to prevent the latter from operating through the linkage to anchor the friction means, and means engageable with the linkage at predetermined points with respect to the fulcrums aforesaid to increase the leverage of the linkage connected to the wrapping portion of the friction means upon expanding the latter into engagement with the brake surface.

17. In a brake assembly, the combination with a brake drum having an annular braking surface, of a floating friction member arranged within the drum for engagement with the braking surface and having spaced ends, actuating mechanism for the friction member including linkage establishing a tie between the ends of said member and carried thereby, fulcrums for the linkage operable upon expanding the friction member into engagement with the braking surface to afford a limited shifting of the friction member together with the levers in the direction of rotation of the drum, and means cooperating with the linkage upon engagement of the friction member with the braking surface for utilizing a percentage of the torque generated by the drum to actuate the linkage for assisting in the application of the brake.

18. In a brake assembly, the combination with a brake drum having an annular braking surface, of floating friction means located within the drum for engagement with the braking surface and having separable end portions, linkage carried by the friction means for movement therewith as a unit and establishing a tie between the ends of the friction means, and journals for the linkage carried by a part fixed relative to the drum and friction means for shifting movement bodily substantially about the axis of the braking surface.

19. In a brake assembly, the combination with a brake drum having an annular braking surface, of floating friction means within the drum for engagement with the braking surface and having separable ends, means for centralizing the friction means within the drum and for insuring return-movement of the latter to a predetermined position after each operation of the brake, said means including a member carried by the friction means for oscillation substantially about the axis of the drum and having an inwardly extending flange portion, a second member mounted upon a part fixed relative to the drum for oscillation about a different axis and having an outwardly extending flange portion overlapping the flange portion aforesaid, and yieldable means normally urging the flange portions into abutting engagement.

CHARLES A. SAWTELLE.
ARMIN A. DARMSTAETTER.